May 15, 1956 E. G. TIEGEL 2,745,367
MEANS FOR MAKING BATTERY PLATE UNITS
Filed April 5, 1949 4 Sheets-Sheet 1
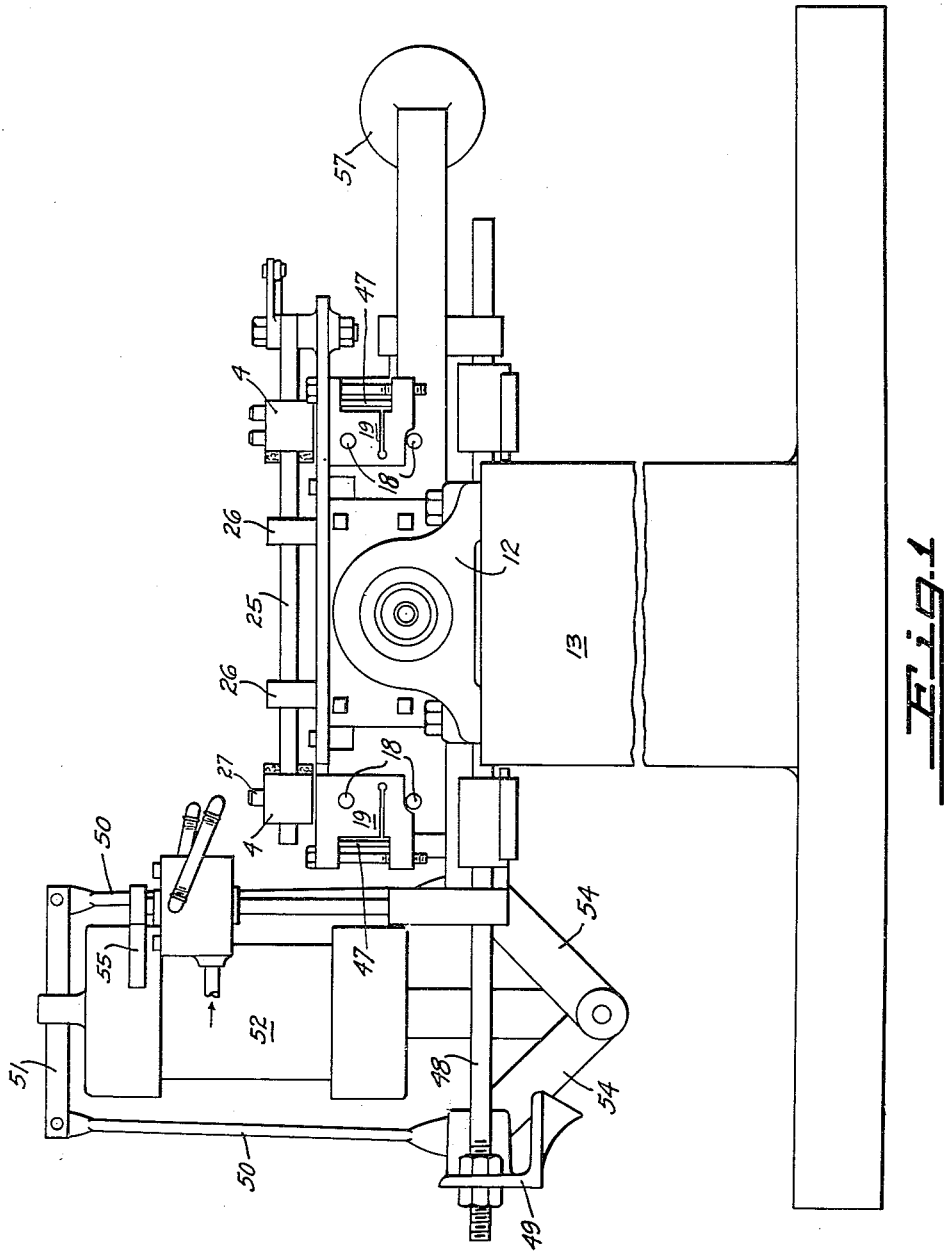
INVENTOR.
ERNEST GEORGE TIEGEL
BY
ATTORNEY May 15, 1956   E. G. TIEGEL   2,745,367
MEANS FOR MAKING BATTERY PLATE UNITS
Filed April 5, 1949   4 Sheets-Sheet 2
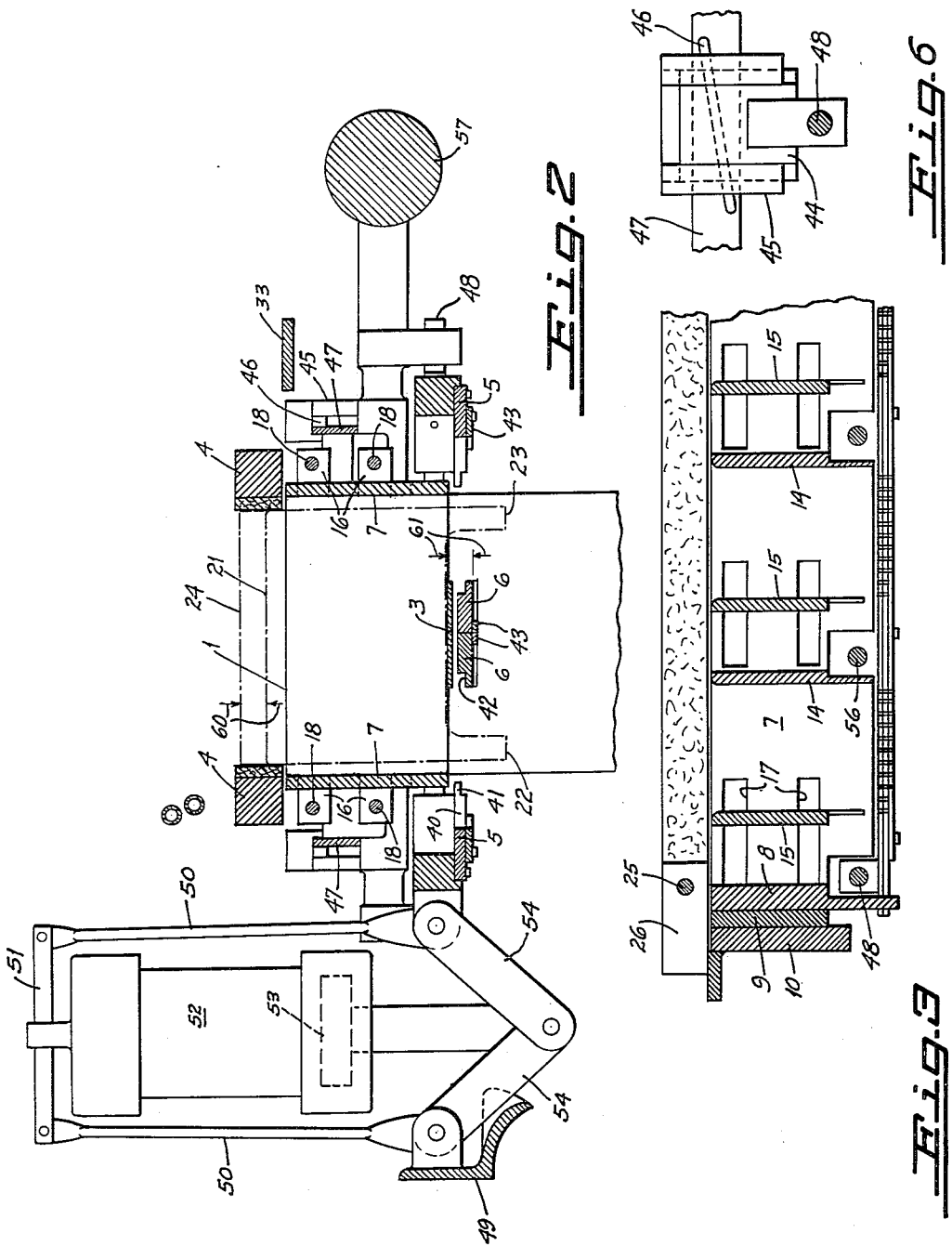
INVENTOR.
ERNEST GEORGE TIEGEL
BY
A. Schapp
ATTORNEY May 15, 1956 E. G. TIEGEL 2,745,367
MEANS FOR MAKING BATTERY PLATE UNITS
Filed April 5, 1949 4 Sheets-Sheet 3
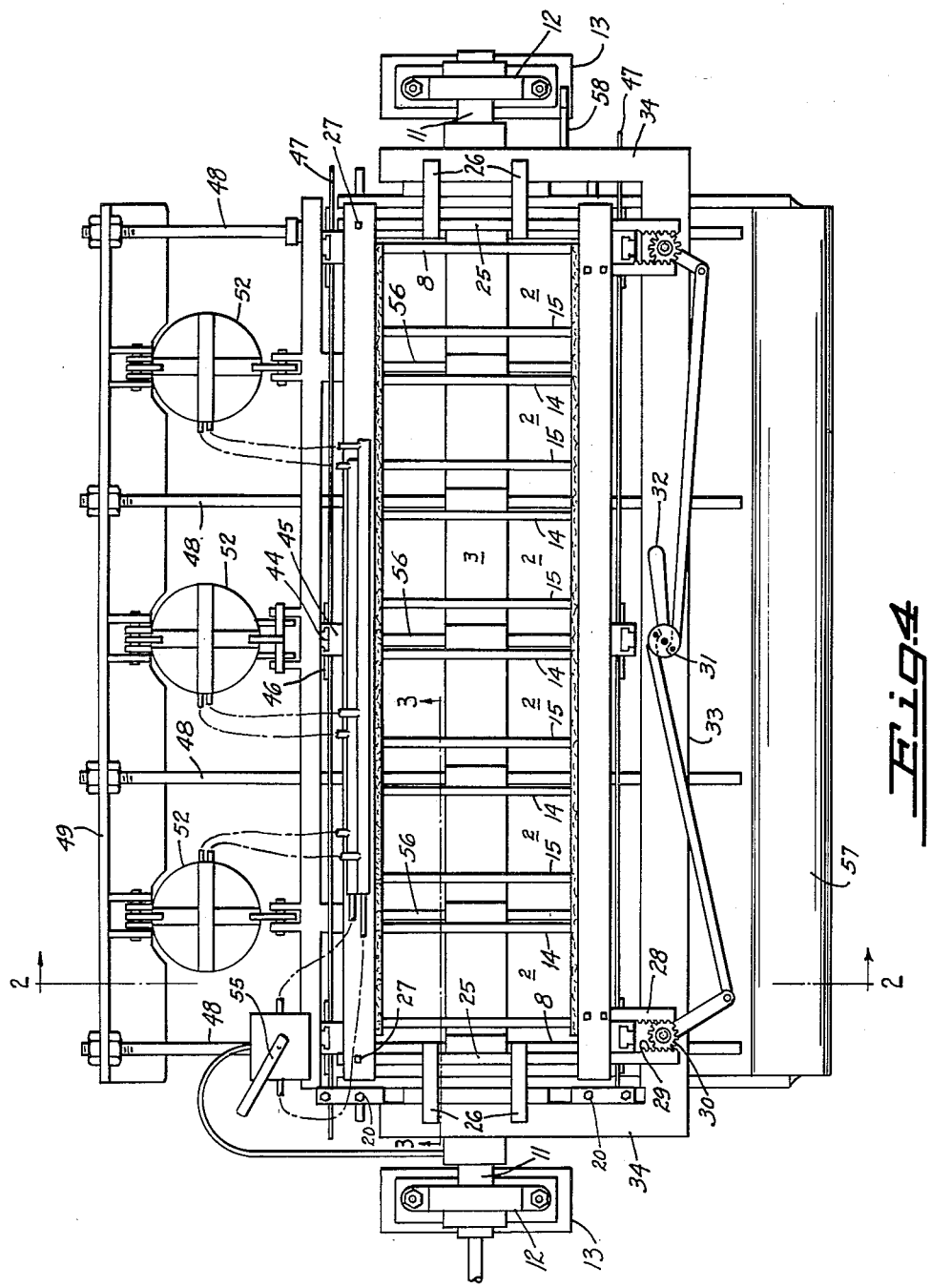
INVENTOR.
ERNEST GEORGE TIEGEL
BY
A. Schapp
ATTORNEY May 15, 1956 E. G. TIEGEL 2,745,367
MEANS FOR MAKING BATTERY PLATE UNITS
Filed April 5, 1949 4 Sheets-Sheet 4
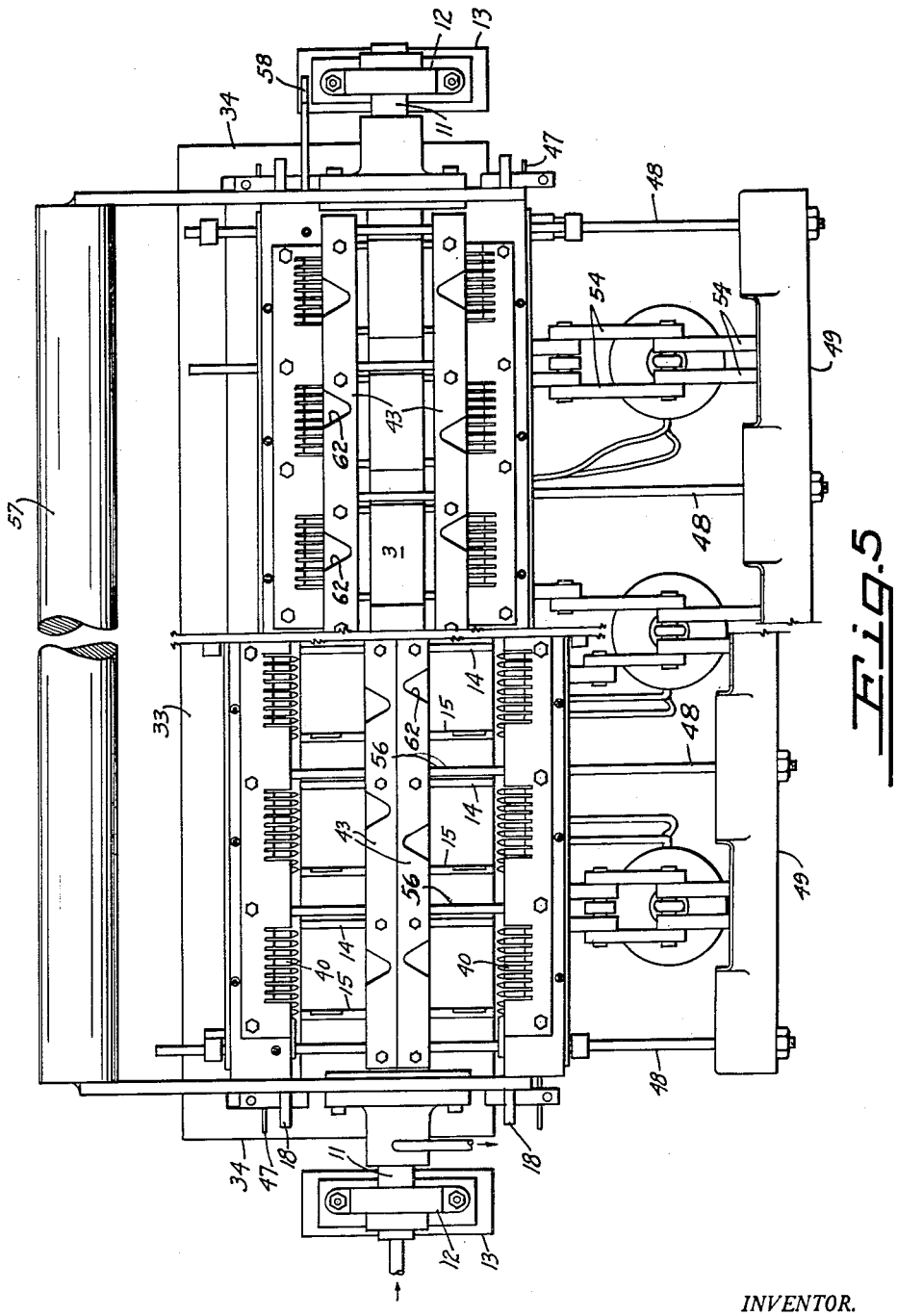
INVENTOR.
ERNEST GEORGE TIEGEL
BY
A. Schapp
ATTORNEY United States Patent Office 2,745,367
Patented May 15, 1956

2,745,367

MEANS FOR MAKING BATTERY PLATE UNITS

Ernest George Tiegel, San Francisco, Calif., assignor to Tiegel Manufacturing Co., Belmont, Calif., a corporation of California Application April 5, 1949, Serial No. 85,656

4 Claims. (Cl. 113—59)

The present invention relates to improvements in means for making battery plate units, and the invention has particular reference to the manufacture of plate units used in electric storage batteries.

The principal object of the invention is to simplify the manufacture of battery plate units. A unit of this character consists of alternating plates usually identified as positive and negative, with individual separators interposed between the plates. The plates have leads projecting therefrom, and in the conventional method they are assembled so as to aline the leads of the positive plates along one edge of the assembly and those of the negative plates along the other edge of the assembly. The leads on opposite sides of the assembly are then electrically connected by a lead burning process during which the positive and negative terminals are anchored to the leads.

Heretofore it has been conventional practice to first assemble and join one set of plates, and in a separate operation assemble and join the other set of plates, whereupon the two sets were interlaced and the separators introduced individually into their respective places.

In the present invention it is proposed to greatly simplify this operation by providing means whereby all the plates and the separators may be initially stacked into a unit and the entire unit may be manipulated through the burning process in a single operation. In carrying out the process of the invention it is proposed as a first step to provide a simple means whereby the lead-carrying edges of the plates and the corresponding edges of the separators of the pre-formed stack automatically arrange themselves into alined relation upon the mere dropping of the assembly into the machine.

As a second step it is proposed to provide means operable by a single handle for aligning the side edges of the assembled plates and separators.

As a third step it is proposed to provide cooperating combs and back-irons for isolating the ends of the leads for burning operations preparatory to the burning step, this step again being carried out for the entire assembly by operation of a single control element.

In the finished unit the outer edges of the plates, that is the edges opposite those carrying the leads, must be alined with the corresponding edges of the separators. In carrying out my process, the inner edges of the plates and the separators are initially alined which causes narrow portions of the separators to project beyond the outer edges of the plates. It is necessary, therefore, after the unit leaves the machine, to push the separators inwardly so as to bring the outer edges into registry and for this purpose it is necessary again that the burning line be fixed with respect to the inner edges of the separators so as to provide the correct space to accommodate the inner edges of the separators when the outer edges are pushed into registry with the outer edges of the plates.

It is further proposed, therefore, in my invention, to provide means whereby the burning line may be exactly adjusted with respect to the inner edges of the plate and separator assembly, to provide a space between the burning line and the said inner edges corresponding exactly to the width of the portions of the separators projecting beyond the outer edges of the plates.

It is further proposed in the present invention to combine all the features hereinabove outlined into a comparatively simple machine, and to arrange the latter in such a manner that a plurality of units may be processed at the same time.

It is additionally proposed, for ease of manipulation, to mount the entire working unit of the machine with freedom of rotary motion through 180° whereby one side of the machine is presented upwardly during the positioning operations during which the battery units are inserted with the plate leads pointing downwardly. After the plates have been positioned the working unit may be turned upsidedown to present the leads on top for facilitating the burning operation.

My machine is intended to accommodate a plurality of plate and separator assemblies at the same time, in a plurality of alined chambers, each chamber being of a length to hold the stack in compact condition. Since different stacks intended for different batteries are made of different thicknesses, it is desirable to make the lengths of the different chambers adjustable, and it is a further feature of this invention to provide means whereby the lengths of all the chambers may be adjusted in a single operation.

Further objects and advantages of my invention will appear as the specification proceeds, and the novel features of my invention will be fully defined in the claims attached hereto.

The preferred form of my invention is illustrated in the accompanying drawing, in which:

Figure 1 shows an end view of my machine,

Figure 2, a transverse section taken along line 2—2 of Figure 4,

Figure 3, a fragmentary section taken along line 3—3 of Figure 4,

Figure 4, a top plan view of the machine positioned for insertion of the pre-stacked plate and separator assemblies, Figure 5, a top plan view of the machine in inverted position, the left one-half of the drawing showing the combs and back-irons in original position, while the right hand side of the drawing shows the combs and back-irons after they have moved towards one another for isolating the ends of the leads for the burning operation, and Figure 6, a detail view of a wedge adjusting means as seen from the right side of Figure 2.

While I have shown only the preferred form of my invention, I wish to have it understood that various changes and modifications may be made within the scope of the claims attached hereto without departing from the spirit of the invention.

Before describing the machine in detail it should be noted that as an initial step in the manufacture of battery plate units in accordance with my invention the operator stacks the positive and negative plates and the separators in conventional order, with the leads of the positive plates projecting from the inner edge of the stack along one side thereof and the leads of the negative projecting from the same edge along the other side thereof. The separators are made somewhat longer than the body portions of the plates, and after the desired number of plates and separators have been stacked in related order, the stack may be squared manually to bring the side edges of the plates and of the separators into approximate registry and to bring the inner edges of the separators into registry with the inner edges of the plates, while the outer edges of the separators project beyond the plates. In this condition the stack is ready for insertion into the machine.

My machine comprises in its principal features an elongated box 1 supported with freedom of rotary motion about a longitudinal axis and divided into a number of compartments 2 adapted to receive the stacked plate assemblies, a rest 3 extending longitudinally along the bottom of the box so as to form a stop for each stacked assembly, clamping members 4 mounted above the box for engaging the side edges of the stacks and for bringing the same into registry, and cooperative combs and back-irons 5 and 6 movable along the bottom of the box for isolating projecting portions of the plate leads for burning operations.

The box 1 comprises a pair of spaced side walls 7 and a pair of end walls 8. A supporting plate 9 is placed upon the outside of each end wall, and a bearing plate 10 upon the supporting plate, the plates being secured upon one another and the end walls by any suitable means. Each bearing plate has a shaft 11 projecting therefrom, the two shafts being revolvably mounted in two bearings 12 supported in standards 13. The two shafts are alined with one another and may be arranged substantially in central relation with respect to the box, although an off-set relation may be preferred for balancing purposes.

The box is divided into a number of compartments or chambers 2, each being defined by a stationary partition 14 and a movable partition 15. One end wall may take the place of one stationary partition. The movable partitions have tongues 16 projecting laterally therefrom, the tongues being slidable in slots 17 in the side walls of the box, and the projecting ends of the tongues being interconnected by rods 18, which latter are slidable in brackets 19 forming part of the end supporting plates 9. In this manner all the movable partitions are interconnected, and if one is adjusted for shortening or lengthening the compartment, all the others are automatically adjusted with the same. The rods may be locked in adjusted position by set screws 20.

Each compartment is adapted to receive a pre-stacked battery plate unit 21, the unit comprising positive plates with leads 22, negative plates with leads 23 and separators 24 arranged in conventional order, with the leads 22 projecting from one edge of the stack (hereinafter referred to as the inner edge) along one side thereof, and the leads 23 projecting from the same edge along the other side thereof, the two sets being spaced sufficiently to leave a body section between the same clear. The separators are somewhat longer than the body sections of the plates, so as to project beyond the outer edges of the plates, when the inner edges are made to register.

After the length of the compartments has been adjusted to take the desired number of plates and separators, the stacked units are dropped into the compartments, in inverted position, and the downward movement of the unit is stopped by a central rest 3 mounted along the bottom of the box throughout the length thereof. The rest is in the form of a strap of metal extending throughout the length of the box and having a bottom surface disposed substantially in the bottom plane of the box and being sufficiently narrow to fit between the two sets of leads 22 and 23. When the unit strikes the rest, the latter causes the inner edges of the plates and of the separators to register while the outer edges of the separators project beyond those of the plates. The width of each compartment is slightly larger than that of the assembled unit.

To insure registry of the side edges, I provide the two clamping bars 4 arranged on opposite sides of the projecting portion of the unit and movable toward one another for clamping upon the unit. These bars are supported in two end shafts 25 slidable in bearings 26 mounted at the ends of the box, one of the bars being fixed to the shaft as at 27 while the other one is slidable thereon. The latter has short rods 28 projecting therefrom in parallel relation to the shafts 25, and the shafts and the rods have opposing rack teeth as at 29, with an interposed pinion 30 operable by a suitable toggle mechanism 31 for moving the shafts and the rods in opposite directions to force the clamping members toward or away from the plate units. Thus the clamping action may be effected simultaneously for all the units by simple operation of the handle 32 operating the toggle mechanism.

The toggle mechanism is supported on a side plate 33 having two end members 34 secured upon the bearing plates 10, the end members also serving as supporting means for the bearings 26.

The comb and back-iron assembly and its operating mechanism are formed as a separate unit which is independently adjustable with respect to the box. There is one set of cooperating combs and back-irons for each set of leads. As shown in Figure 2, the two combs 5 are mounted outside the box, when inactive, while the back-irons 6 are mounted underneath the rest 3, the combs and back-irons being mounted in the same horizontal plane for sliding movement underneath the box.

Each comb comprises an elongated plate which may extend through the length of the box and which has been cut to present a number of teeth 40 along the inner edge thereof, the teeth being adapted to enter the spaces between the battery plate leads. The front ends of the teeth are recessed to present projecting tongues 41 adapted to be received in corresponding grooves 42 of the back-irons. When the combs and the back-irons are moved toward one another they completely enclose the plate leads and isolate projecting portions thereof for lead burning operations.

The combs and the back-irons have confining plates 43 mounted upon the bottom faces thereof which are shaped to form cavities about the projecting end of the leads for accommodating battery posts and for limiting the flow of the lead during the burning operation.

The comb and back-iron assembly is supported by means of a number of T-shaped members 44 slidable in vertical channels 45 secured upon the sides of the box, the T-shaped members being adjustable for height by means of wedges 46 mounted on straps 47 extending throughout the length of the machine. The straps 47 are slidable in the channels adjacent the T-shaped members, and the wedges 46 ride in registering grooves in the T-shaped members so as to raise or lower the same when the straps 47 are moved in one direction or the other. The T-shaped members carry bearings for transverse rods 48 which are adapted to slide through the lower section of the box at portions not occupied by the plate assemblies.

These rods carry the combs and the back-irons, and also a back plate 49 spaced from one side of the box.

The back plate 49 and the nearest comb 5 support, on rods 50 and cross-members 51, a series of cylinders 52 having pistons 53 therein adapted to operate links 54 for moving the back bar 49 and the near comb toward each other or away from each other. The pistons may be operated for movement in either direction by air pressure, preferably all under control of a single valve shown at 55.

The back bar 49, both combs 5 and both back-irons 6 are supported by the rods 48. Three of these elements, namely the back bar 49, the first back iron 6 and the second comb 5 are fixed on the rods 48, while the two other elements, namely the first comb 5 and the second back iron 6, are slidable on the rods 48 and are interconnected by shorter rods 56 lying in the same horizontal plane as the rods 48.

Thus, when the piston 53 (Figure 2) is moved upward, the back bar 49 moves away from the machine, that is to the left, and the first back bar 6 and the second comb 5, move in the same direction. At the same time, the first comb 5 moves to the right, and the second back bar 6 moves with the same.

Only the two outer bars 48 are actually supported in the T-shaped members 44, while the two other are principally intended to strengthen the structure. Of the connecting bars 56 only one, namely the central one, is actually supported by the T-shaped members 44, while the other bars add to structural strength.

A suitable weight 57 is mounted on the side of the box opposite the cylinder assembly to counterbalance the weight of the cylinder assembly and to facilitate the operation of turning the entire assembly on the shafts 11. The use of the counterweight might possibly be dispensed with by off-setting the supporting shafts 11 with respect to the box so as to cause the latter to balance the weight of the cylinder assembly.

Suitable stops 58 are provided for cooperation with the bearing standards 13 in holding the box assembly in either one of its two horizontal positions.

In operation, the compartments of the box are first adjusted to the size of plate assembly for which the machine is to be used. This may be readily done by dropping one plate assembly into one of the compartments 2 and by pushing the movable partition 15 of that compartment upon the plate assembly so as to compact the latter to a desired degree. This adjustment automatically takes care of all the other movable partitions which move in unison with the one that is being adjusted.

Next, the machine may be adjusted to the proper burning height. In the pre-stacked plate and separator assembly, if the inner edges of the plates and the separators are brought into registry, the outer edges of the separators will project beyond the outer edges of the plates by a certain margin indicated by the arrows 60 in Figure 2. The burning height, that is, the distance between the top plane of the rest 3 and the bottom plane of the combs, as indicated by the arrows 61 in the same figure, should be made to correspond exactly to the margin identified by the arrows 60. This adjustment may be readily made by endwise adjustment of the straps 47 causing the wedges 46 to raise or lower the T-shaped members 44 in the vertical channels 45, since the entire comb and cylinder assembly is supported by the T-shaped members.

After these preliminary adjustments have been made, the machine may be used for any number of operations involving battery plate units having the same specifications.

For individual operations, the operator drops six pre-stacked plate and separator assemblies, leads first, into the six compartments so as to come to rest on the rest straps 3, with the leads projecting beyond the straps. Next he operates the handle 32 of the toggle joint to urge the clamps 4, which preferably carry sponge rubber linings, upon the side edges of the assemblies. He then operates the valve handle 55, to cause the combs and back-irons 5 and 6 to close in on the plate leads, isolating the ends of the leads for burning operations.

The operator now turns the entire box assembly upside down as in Figure 5, inserts his battery terminals in the recesses 62 and fuses the base portions of the terminals and the projecting portions of the plate leads by the well-known lead burning process, filling the cavity left between the confining plates 43.

The units may then be removed, upon release of the positioning means, and the separators may then be pushed up to the burning line, which will bring the outer edges of the separators into registry with the outer edges of the plates.

I claim:

1. In a machine of the character described, means for positioning a pre-stacked plate and separator assembly having two spaced series of leads projecting from one edge thereof, comprising a box invertibly mounted about a horizontal axis and having an open top for slidably receiving the assembly with the said edge in leading position and having a rest across the bottom adapted for engaging the body portions of the plates and the separators for stopping the same while allowing the leads to project downward beyond the rest, the box having end walls of normally fixed spacing to accommodate the thickness of the assembly, and side walls of fixed spacing in excess of the width of the assembly to allow a relatively loosely arranged assembly to readily drop between the same, and the rest being in the form of a centrally-located fixed plate essentially narrower than the spacing between the leads to provide ample space for loosely alined leads to pass on opposite sides thereof, clamping bars mounted on the box and above the same and having means for moving the same to project inside the box and upon the upper side edges of the assembly for centering the upper portions of the plates and the separators with respect to the box, cooperative combs and back-irons carried by the box and mounted below the bottom level of the box and of the rest and in spaced relation thereto, and means for moving the combs and back-irons into engagement with the leads for centering the lower portions of the plates and the separators and for isolating the lower ends of the leads for burning operations.

2. In a machine of the character described, means for positioning a pre-stacked plate and separator assembly having two spaced series of leads projecting from one edge thereof, comprising a box invertibly mounted about a horizontal axis and having an open top for slidably receiving the assembly with the said edge in leading position and having a rest across the bottom adapted for engaging the body portions of the plates and the separators for stopping the same while allowing the leads to project downward beyond the rest, the box having end walls of normally fixed spacing to accommodate the thickness of the assembly and side walls of fixed spacing in excess of the width of the assembly to allow a relatively loosely arranged assembly to readily drop between the same, and the rest being in the form of a centrally located fixed plate essentially narrower than the spacing between the leads to provide ample space for loosely alined leads to pass on opposite sides thereof, clamping bars mounted on the box and above the same and having means for moving the same to project inside the box and upon the upper side edges of the assembly for centering the upper portions of the plates and the separators with respect to the box, cooperative combs and back-irons carried by the box and mounted below the bottom level of the box and of the rest and in spaced relation thereto, and means for moving the combs and back-irons into engagement with the leads for centering the lower portions of the plates and the separators and for isolating the lower ends of the leads for burning operations, the separators being made to project above the plates of the assembly when the latter is supported by the rest, and the cooperative combs and back-irons having means for vertically adjusting the same to establish a burning height equal to the width of the projecting portions of the separators.

3. A combination as defined in claim 1, in which the side edges of the separators are made to slightly project beyond the side edges of the plates and in which the clamping bars have layers of foam rubber facing the side edges to follow the undulations thereof and to protect the projecting edges of the separators.

4. A combination as defined in claim 1, in which the combs and back irons have confining plates mounted upon the bottom faces thereof shaped to form cavities about the projecting ends of the leads for accommodating battery posts during the burning operations.

References Cited in the file of this patent

UNITED STATES PATENTS

| Re. 22,234 | West | Dec. 15, 1942 |
| 871,393 | Flanders | Nov. 19, 1907 |
| 974,601 | Sampson et al. | Nov. 1, 1910 |
| 1,037,912 | Howard | Sept. 10, 1912 |
| 1,391,649 | Hahn | Sept. 20, 1921 |
| 1,396,162 | Campbell | Nov. 8, 1921 |

(Other references on following page)

UNITED STATES PATENTS

| | | |
|---|---|---|
| 1,410,716 | Peers | Mar. 28, 1922 |
| 1,478,786 | Hazelett | Dec. 25, 1923 |
| 1,495,894 | DuBois | May 27, 1924 |
| 1,932,136 | Hole | Oct. 24, 1933 |
| 1,939,651 | Bales | Dec. 19, 1933 |
| 1,960,195 | Nyce | May 22, 1934 |
| 2,287,802 | Hill | June 30, 1942 |
| 2,388,922 | Liesken | Nov. 13, 1945 |
| 2,430,188 | Sargent | Nov. 4, 1947 |
| 2,459,561 | Yawman | Jan. 18, 1949 |
| 2,505,514 | Anderson | Apr. 25, 1950 |
| 2,516,546 | Brown | July 25, 1950 |
| 2,526,335 | Deichert | Oct. 17, 1950 |
| 2,539,318 | Orsino | Jan. 23, 1951 |